(12) United States Patent
Nakajima

(10) Patent No.: US 8,155,149 B2
(45) Date of Patent: Apr. 10, 2012

(54) PACKET ASSEMBLY IN A COMMUNICATION NETWORK SUPPORTING VIRTUAL NETWORKS

(75) Inventor: Hisao Nakajima, Lannion (FR)

(73) Assignee: France Telecom, Paris (FR)

( * ) Notice: Subject to any disclaimer, the term of this patent is extended or adjusted under 35 U.S.C. 154(b) by 164 days.

(21) Appl. No.: 12/523,544

(22) PCT Filed: Jan. 15, 2008

(86) PCT No.: PCT/FR2008/050070
§ 371 (c)(1),
(2), (4) Date: Jul. 17, 2009

(87) PCT Pub. No.: WO2008/107590
PCT Pub. Date: Sep. 12, 2008

(65) Prior Publication Data
US 2010/0118891 A1    May 13, 2010

(30) Foreign Application Priority Data
Jan. 19, 2007   (FR) ...................................... 07 52782

(51) Int. Cl.
*H04J 3/24* (2006.01)
*H04J 3/00* (2006.01)
*H04J 14/00* (2006.01)
*H04J 14/02* (2006.01)

(52) U.S. Cl. .......... 370/474; 370/475; 370/476; 398/45; 398/83

(58) Field of Classification Search ........................ None
See application file for complete search history.

(56) References Cited

U.S. PATENT DOCUMENTS

| 2001/0050914 | A1 | 12/2001 | Akahane et al. |
| 2002/0037010 | A1 | 3/2002 | Yamauchi |
| 2006/0133811 | A1* | 6/2006 | Gumaste et al. ................ 398/83 |
| 2008/0117818 | A1* | 5/2008 | Cox et al. ...................... 370/231 |

OTHER PUBLICATIONS

Series Y: Global Information Infrastructure and Internet Protocol Aspects, Internet protocol aspects—Transport, Network-based VPNs—Generic architecture and service requirements, International Telecommunication Union, Telecommunication Standardization Sector, ITU-T Recommendation Y-1311, Mar. 2002.

(Continued)

*Primary Examiner* — Xavier Szewai Wong
(74) *Attorney, Agent, or Firm* — Lowe Hauptman Ham & Berner, LLP

(57) ABSTRACT

In a first node, through which optical packets are able to input to the communication network, optical packets coming from the virtual network are assembled in packet field. The first node constructs a burst comprising the packet field and a label preceding the packet field and including helping to identify the virtual network and second information helping to identify a path between said first node and a second node through which the packets are able to output from the communication network. Each packet in the packet field can be preceded by an identifier identifying an interface through which the packet outputs from the communication network, and derived from a destination address in the packet.

15 Claims, 4 Drawing Sheets

OTHER PUBLICATIONS

Series Y: Global Information Infrastructure, Internet Protocol Aspects and Next Generation Networks, Internet protocol aspects—Transport, Layer 1 Virtual Private Network generic requirements and architecture elements, International Telecommunication Union, Telecommunication Standardization Sector, ITU-T Recommendation Y-1312, Sep. 2003.

Series Y: Global Information Infrastructure, Internet Protocol Aspects and Next Generation Networks, Internet protocol aspects—Transport, Layer 1 Virtual Private Network service and network architectures, International Telecommunication Union, Telecommunication Standardization Sector, ITU-T Recommendation Y-1313, Jul. 2004.

Lisanti, M. et al., Architectural and Technological Issues for Future Optical Internet Networks, IEEE Communications Magazine, Sep. 2000, pp. 82-92.

Qin, Y. et al., Framework for Dynamic Optical Virtual Private Networks (VPNs): Architecture and Analysis, IEE Proc.-Commun., vol. 151, No. 1, Feb. 2004, pp. 71-76.

Qiao, C., Labeled Optical Burst Switching for IP-Over-WDM Integration, IEEE Communications Magazine, Sep. 2000, pp. 104-114.

\* cited by examiner

PACKET ASSEMBLY IN A COMMUNICATION NETWORK SUPPORTING VIRTUAL NETWORKS

RELATED APPLICATIONS

The present application is based on, and claims priority from, FR Application Number 0752782, filed Jan. 19, 2007, and PCT Application Number PCT/FR08/050070, filed Jan. 15, 2008, the disclosures of which are hereby incorporated by reference herein in their entireties.

The present invention relates to a packet assembly to be transmitted into a virtual network supported by a communication network comprising nodes through which packets come in and get out of the communication network.

More particularly, it is related to a burst assembling packets to be transmitted into a Virtual Private Network VPN based on the resources of an optical packet switching communication network for secured connections between customer equipments such as routers of a business private network.

International organizations in the field of telecommunications recommend using the resources of a communication network of the internet-based transport network or ATM ("Asynchronous Transfer Mode") type during the lifetime of a VPN virtual private network. The resources of the communication network can be shared between VPN virtual networks using the Time Division Multiplexing TDM, for example, according to the SDH ("Synchronous Digital Hierarchy") protocol. According to another solution, the resources of the communication network are exclusively dedicated to VPN virtual networks. For example, wavelengths in links within the core of the communication network are dedicated respectively to VPN virtual networks and during the lifetimes of such virtual networks.

A VPN virtual network at a level 1 is defined between service interfaces present between equipments on the Customer Edge CE and equipments on the communication network edge PE ("Provider Edge"). The communication network managed by a provider P provides VPN virtual private networks with the resources of the communication network allowing for PE-P-PE connections. Such resources can be one or more wavelengths, or one or more virtual circuits depending on the SDH protocol, dedicated to a VPN virtual private network during the life time thereof. Furthermore, a multicast transfer is ensured by multiple point-to-point connections.

The granularity in terms of transport by level 1 VPN virtual networks may be the granularity at the level of the wavelength in optics or a finer granularity with the TDM time multiplexing in electronics. The granularity in the communication network determines the transport granularity in networks VPN and the maximum number of networks VPN feasible with one wavelength.

OBS ("Optical Burst Switching") communication networks based on an optical packet switching in the burst mode are currently studied according to the paper entitled "Labeled Optical Burst Switching for IP-over-WDM Integration", Chunming Qiao, IEEE Communications Magazine, September 2000, pages 104-114. The OBS networks can be considered as an optical version of the internet network. In order to derive a profit from the statistical multiplexing mechanism, packets according to the IP Internet Protocol are assembled into asynchronous optical bursts with a varying time length. The resources of the communication network, namely paths and nodes, are only dedicated when a burst is to pass through the communication network.

FIG. 1 herein appended shows the operating principle of the transfer plane of a communication network RE through optical packet switching in the OBS type burst mode for two embodiments according to which the resources of the RE network are configured respectively using labels LB and control packets CP, the processing of which is provided in the electronic field. The RE communication network consists in input and output switching nodes I, J, K and L and of core switching nodes M, N and O through which optical bursts BT transit. Such nodes are interconnected through WDM Wavelength-Division Multiplexing optical fiber links. For example, packets P1 and P2 coming from routers A and B are assembled into a burst (P1, P2) electronically in the input node L before converting and emitting it under the form of an optical burst in the network RE, and the optical burst is converted in the form of an electronic burst and disassembled in an output node J into the packets P1 and P2 routed towards recipient routers E and D.

According to a first embodiment, a burst BT comprises as a header a label LB, in which information regarding the contents and routing of the burst is written. Label LB is intended for configuring intermediate core nodes M and O on the pre-calculated path, for example L-M-O-J, between the input node L and the output node J.

According to the second embodiment, a control packet CP is preliminarily sent for completing the configuration of each core node M, O on the path so as to reserve a time frame, i.e. a time interval necessary for transmitting the burst. Afterwards the burst (P1, P2) is transmitted through the input node L without waiting for any acknowledgement for the transmission of the control packet CP and crosses each core node M, O up to the output node J.

The invention does not make use of control packets in a communication network through optical packet switching in the OBS type burst mode.

Furthermore, as part of the current international recommendations, it is contemplated to build VPN Virtual Private networks making use of the dedicated or shared resources of a transport network ("Network-Based VPN"). A VPN virtual private network connects two or more customer local networks, for example, IP routers of such customer local networks, securely exchanging IP ("Internet Protocol") packets through the internet or a communication network transporting IP packets.

When connectivity resources of the communication network such as wavelengths are dedicated to VPN virtual networks, at least one wavelength is dedicated to a VPN network for the duration of the VPN network independently from the actual variations of the packet stream in the VPN network. Such an operating mode wastes the resources on one hand and restricts to a low number the VPN networks able to be built by wavelength and by time interval on the other hand. The number of VPN networks depends on the number of the necessary wavelengths and the duration of each VPN network including the times necessary for building and destroying the same. Such last times are approximately one second in the best of cases.

When the transport resources of the VPN networks are shared, the resources establishing the connectivity of the communication network are based on the TDM Time Division Multiplexing, for example, on the digital data transmission protocol SDH ("Synchronous Digital Hierarchy") with high flow rate or SONET in the U.S.A. With such an operating mode, the product of flow rate by the number of VPN networks is limited by the maximal flow rate ensured by a wavelength. A large instantaneous flow rate cannot be associated with a large number of VPN networks at a time. Furthermore, the transported optical signal being should necessarily be converted into an electronic signal at each node of the communication network to make profit of such an operating mode.

The VPN networks based on such operating principles do not allow for a large instantaneous flow rate to combine with a high number of VPN networks.

In order to overcome the above-described drawbacks, the invention provides a burst for assembling optical packets to be transmitted in a virtual network supported by a communication network, characterized in that it comprises a label preceding a packet field assembling optical packets coming from the virtual network and able to input to the communication network through a first node and to output from the communication network through a second node, said label including first information helping to identify the virtual network and second information helping to identify a path between the first and second nodes, the first and second information being unchanged during the crossing between the first and second nodes of the communication network by the burst.

According to the invention, a burst is provided by a method of assembling optical packets to be transmitted in a virtual network supported by a communication network comprising nodes through which optical packets input to and output from the communication network. The method is characterized in that in a first node through which packets are able to input to the communication network, it comprises assembling packets coming from the virtual network in a packet field and constructing a burst comprising the packet field and a label preceding the packet field and including first information helping to identify the virtual network and second information helping to identify a path between the first node and a second node through which the packets are able to output from the communication network.

Operating the communication network through multiplexing bursts statistically and optically according to the invention in the first and second nodes, referred to as input node and output nodes, associates a large instantaneous flow rate and a high number of virtual networks, as at the electronic level in a router for a network according to the IP protocol.

Making use of statistical multiplexing technique such as in IP routers advantageously provides for a finer granularity in the transport field for virtual networks than the wavelength while using the granularity of wavelength link in the communication network without making use of the TDM time multiplexing. The statistical multiplexing advantageously absorbs the various bursts of the equipments in the customer local networks and is based on the average traffic for the whole of the local networks and not on maximum traffics as requested by customers. This smoothes variations of the customer equipment flow rates which are high during the bursts and low between bursts, and further optimizes the communication network occupancy in assembling optical packets received from one customer of a VPN type virtual network into bursts able to include a high number of optical packets.

In the first node through which packets are able to input to the communication network, the first information helping to identify the virtual network for each packet received by the first node can be derived from the crossing of the packet through a respective interface connected to the first node. Such an interface operates as a boundary between the virtual network and the communication network and the first information is thus independent from a source address in the packets. The second information helping to identify a path between the first and second nodes for each optical packet received by the first node can be derived from a destination address, as a prefix thereof, read in the packet to be assembled in the burst. The second information is used for selecting an address of the second node through which the packet is able to output from the communication network, and thus a path between the first and second nodes preconfigured in routing tables of the nodes of the communication network.

Conversely, the invention further relates to a method of disassembling packets to be transmitted in a virtual network supported by a communication network. The disassembling method is characterized in that in a second node through which packets coming from the virtual network following a path from a first node through which packets are able to input to the communication network, are able to output from the communication network, it comprises disassembling a burst transmitted by the communication network into packets coming from the virtual network and a label preceding the packets and including a first information helping to identify the virtual network and a second information helping to identify said path.

In order to make easier disassembling a burst received in the second node, the packet field can comprise a first sub-field including the number of packets included in the packet field and the length of the packet field. Each packet in the packet field of the burst can be preceded by an identifier identifying an interface which is connected to the second node and through which the packet outputs from the communication network, the identifier being derived from a destination address in the packet, thus directing appropriately the packet to a recipient customer equipment. The interface connected to the second node is also at the boundary between the virtual network and the communication network. For example, the interface identifier preceding the packet in the packet field of the burst is at least one part of the address of a recipient equipment of the packet.

The invention also relates to packet input functions in an input and output node of the communication network, as the first node, to a core node and to packet output functions in an input and output node of the communication network, as said second node.

A node, as said first node, through which packets to be transmitted in a virtual network are able to input to a communication network supporting the virtual network, the communication network comprising nodes through which packets input to and output from the communication network, is characterized in that is adapted to assembly packets coming from the virtual network in a packet field and to construct a burst comprising the packet field and a label preceding the packet field and including first information helping to identify the virtual network and second information helping to identify a path between said node and a second node through which the packets are able to output from the communication network, the first and second information being unchanged during the crossing of the communication network by the burst between the first and second nodes.

A core node through which packets to be transmitted in a virtual network are able to transit in a communication network supporting the virtual network, the communication network comprising nodes through which packets input to and output from the communication network, is characterized in that is adapted to optically store a burst comprising a packet field assembling packets coming from the virtual network and a label preceding the packet field and including first information helping to identify the virtual network and second information helping to identify the path between a first node through which the packets are able to input to the communication network and a second node through which the packets are able to output from the communication network, the first and second information being unchanged during the crossing of the communication network by the burst between the first and second nodes, to search for an output port directed to the next node following the path corresponding to the first information, such as an identifier of the virtual network, and the second information, such as an identifier of the path, read in the label, and to transfer the burst to the output port to insert it into the traffic towards the next node.

A node, as said second node, through which packets to be transmitted in a virtual network are able to output from a communication network supporting the virtual network, is characterized in that is adapted to disassembly into packets coming from the virtual network a burst comprising a packet field assembling the packets before each of which an identifier identifying an interface through which the packet is able to output from the communication network is introduced, and a label preceding the packet field and including first information helping to identify the virtual network and second information helping to identify a path between a first node through which the packets are able to input to the communication network and said node, and to search for identifiers of the interfaces read in the burst in association with the first information, such as an identifier of the virtual network, to transfer the packets via the interfaces.

Finally, the invention relates to computer programs adapted to be implemented in the nodes and comprising instructions which, when the programs are executed in the nodes, perform the steps according to the packets assembling method of the invention.

Other features and advantages of the present invention will become more clearly apparent on reading the following description of several embodiments of the invention, given by way of nonlimiting example, with reference to the corresponding appended drawings, in which:

FIG. 1 is a block diagram of a communication network through OBS type optical burst switching according to the prior art;

FIG. 2 is a block diagram of an OBS type communication network wherein packets are transferred according to the invention from a first customer equipment of a virtual private network to two customer equipments of the virtual private network attached to an input and output node and other packets are transferred according to the invention from the first customer equipment to another customer equipment of the virtual private network attached to another input and output node;

Figure 5:
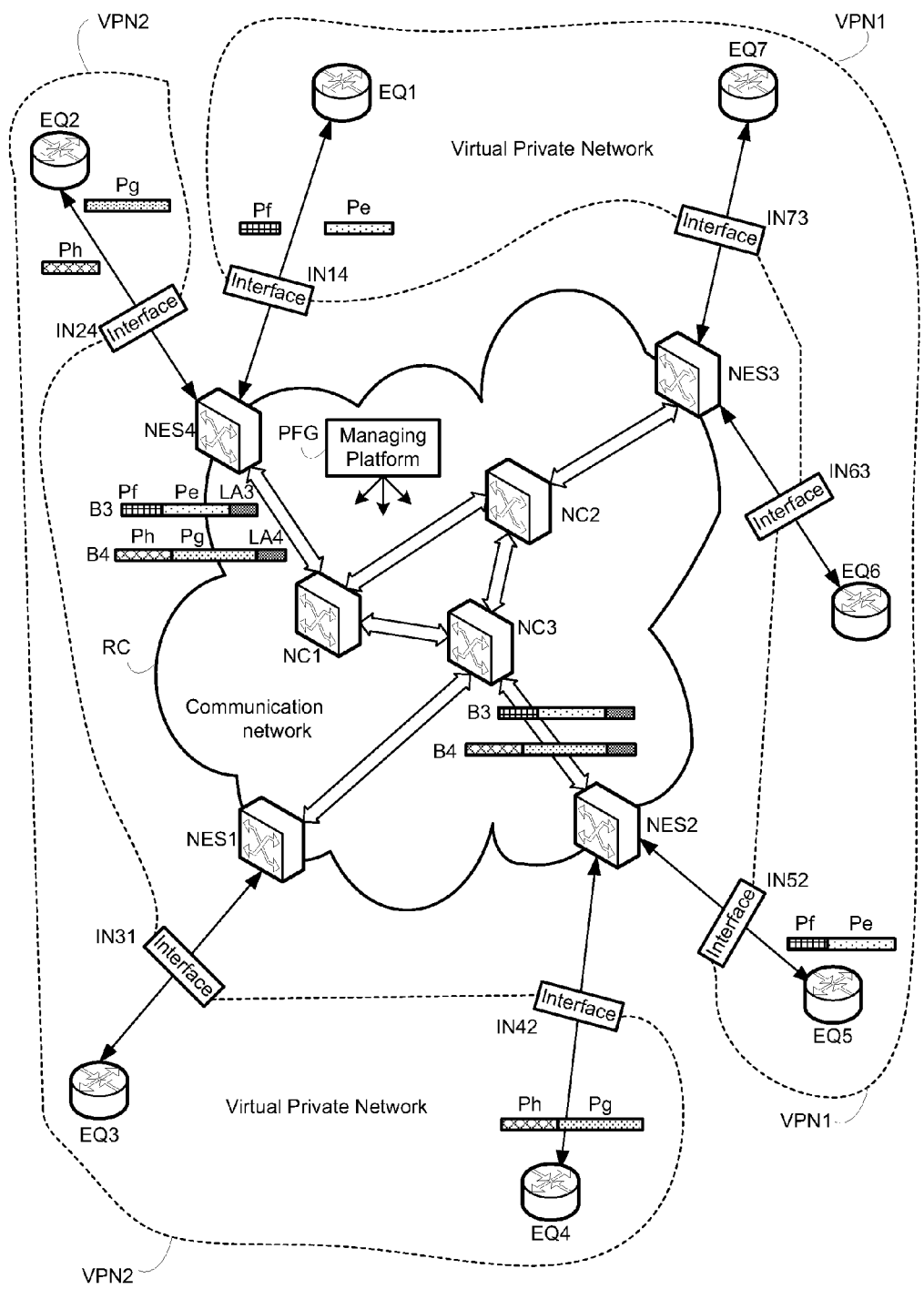

FIG. 5 is a block diagram of an OBS type communication network wherein optical packets are transferred according to the invention from one customer equipment of a first virtual private network and from one customer equipment of a second virtual private network both attached to an input and output node respectively to another customer equipment of the first virtual private network and another customer equipment of the second virtual private network both attached to another input and output node.

Figure 1:
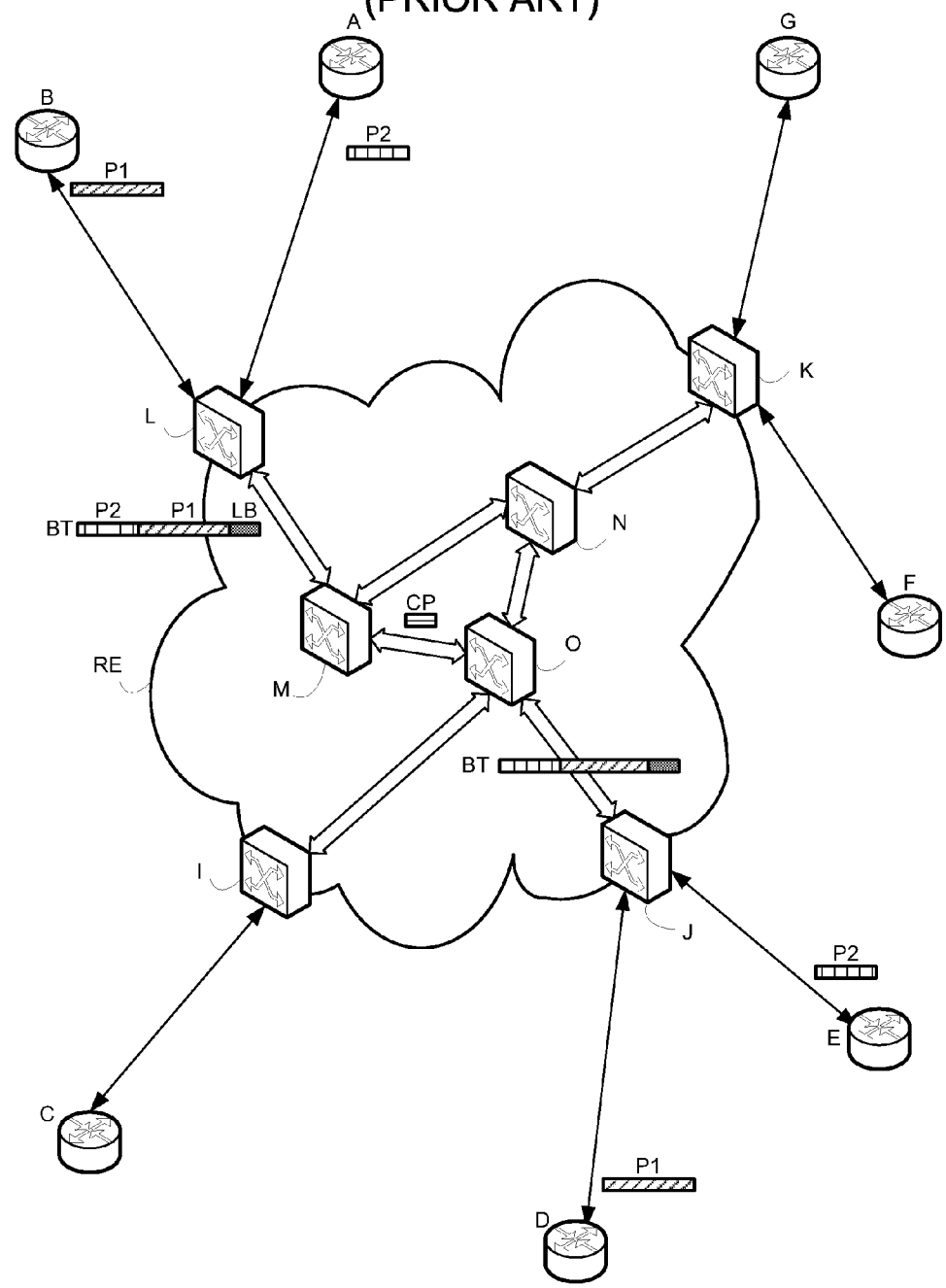
Figure 2:
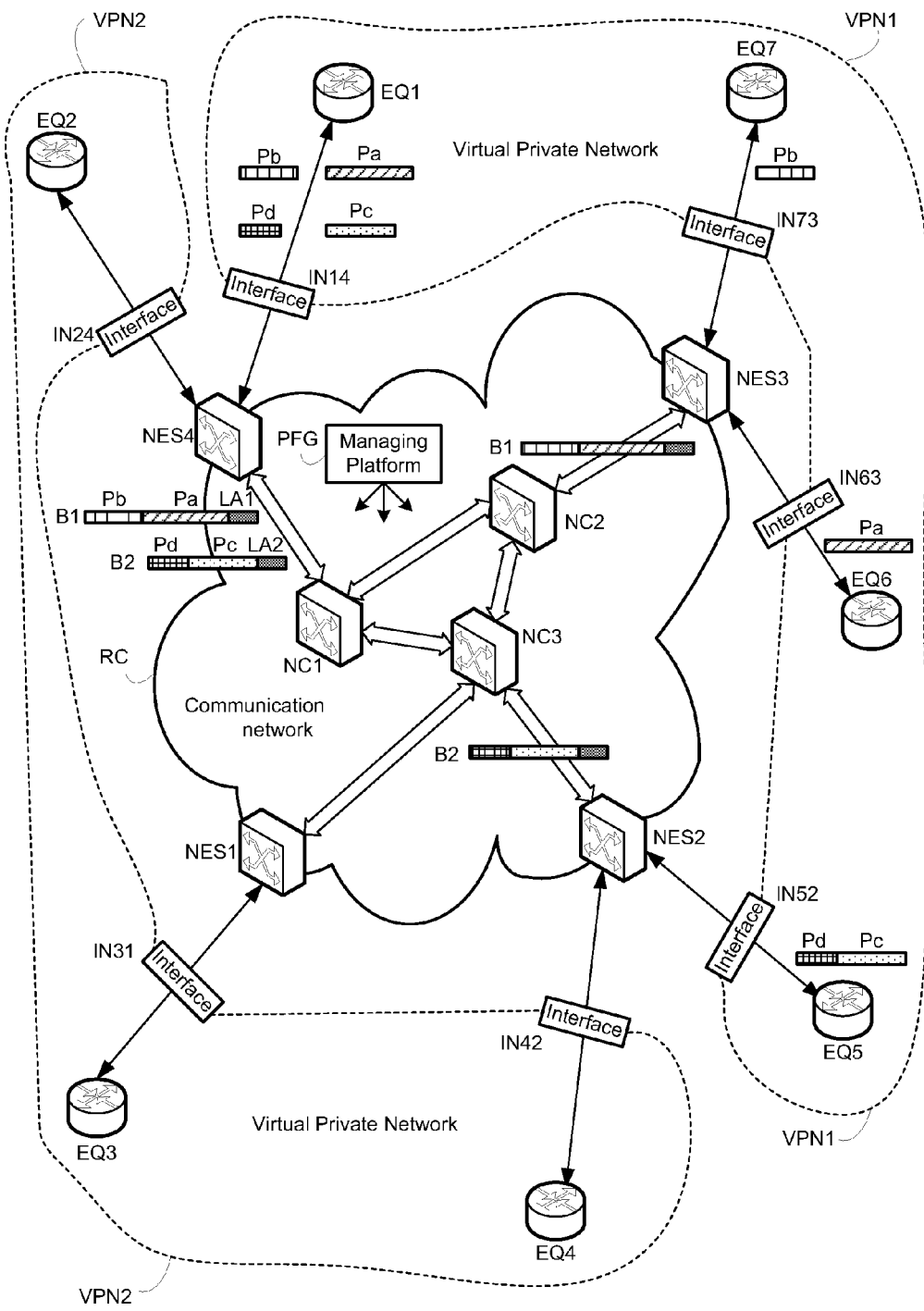

On FIGS. 2 and 5, it is referred to an embodiment of a communication network RC of the OBS Optical Burst Switching type based on optical packet switching in the burst mode, comprising input and output nodes NES1 to NES4 and core nodes NC1 to NC3 and connected to customer equipments EQ1 to EQ7, such as routers of local networks. The customer equipments EQ1 and EQ2 are attached to the node NES4 via input and output interfaces IN14 and IN24. The customer equipment EQ3 is attached to the node NES1 via an input and output interface IN31. The customer equipments EQ4 and EQ5 are attached to the node NES2 via input and output interfaces IN42 and IN52. The customer equipments EQ6 and EQ7 are attached to the node NES3 via input and output interfaces IN63 and IN73.

The equipments EQ1, EQ5, EQ6 and EQ7 belong to a first virtual private network VPN1 limited by the communication interfaces IN41, IN52, IN63 and IN73 with respect to the communication network RC. The equipments EQ2, EQ3 and EQ4 belong to a second virtual private network VPN2 limited by the interfaces IN24, IN31 and IN42 with respect to the communication network RC.

The links between the nodes in the network RC consist essentially in optical fibers supporting a WDM wavelength-division multiplexing. In the optical links between the nodes, a wavelength is only assigned to one single virtual private network, and a virtual private network can occupy one or more wavelengths in a link between two nodes.

The invention is not limited to the above-mentioned numbers of nodes and customer equipments, to the above-mentioned number of virtual private networks and customer equipments by virtual private network and to the illustrated architecture of the communication network RC.

The input and output nodes NES1, NES2, NES3 and NES4 are gateways between the customer equipments and the network RC and each have available interfaces connected to customer equipment belonging to a same VPN virtual network or to different VPN virtual networks. Each input and output node assembles packets P inputting to the network RC and transmitted by respective equipments into bursts B transmitted towards core nodes and disassemble bursts transmitted from the core nodes of the network RC into packets outputting from the network and transmitted towards respective equipments.

Thus, for example, two bursts belonging to a same network VPN can cross the network RC towards different "output" nodes, two bursts belonging to one same network VPN can follow two different paths in order to get to the same "output" nodes, two bursts belonging to two different networks VPN can cross the network RC to one same "output" node following a same path or two different paths, and two packets coming from the same "input" path can be sent to one same "output" node and output from the network RC through two different interfaces.

In order to direct the packets and the bursts according the above examples, a given input and output node of the OBS network comprises the following means.

As an input node, the given input and output node comprises means for forming a burst at an input of the network RC from incoming optical packets to be assembled as a function of an identifier of a VPN virtual network indicating to which the customer equipment or equipments having transmitted the packets from the network VPN belongs, and as a function of a destination address read in the packets and identifying an output node associated with an identifier for a transfer path between the given input and output node and said output node, for recognizing the input interface for each packet inputting to the given node and thus the network VPN to which each packet belongs and thereby associating each formed burst with a VPN virtual network to which it belongs and identifying the transfer path to be followed for each burst and directing it towards an output port of the given node. Optionally the given input and output node can still comprise means for calculating possible paths for each pair comprising the given node and an input and output node getting out of the packets belonging to each network VPN serviced by the given node and optionally, reserving resources for each network VPN serviced by the given node.

Optical packets transiting in one same VPN virtual private network and crossing in an input and an output of the network RC of the common input and output nodes NES and thus able to follow the same transfer path in the network RC are assembled in the common "input" node for filling a packet field CP in a burst B, for example when the number of such packets reaches a predetermined maximum adapted to depend on the flow rate provided to the network VPN, or when a predetermined period of time has elapsed since receiving the first of such packets in the common "input" node.

As an output node, the given input and output node comprises means for disassembling the bursts transmitted by a core node towards an input port of the given node into packets transferred to output interfaces IN of one or more VPN virtual networks and recognizing to which VPN virtual network each burst as received by the given node belongs; for recognizing the output interface for each packet outputting from the given node and thus to which a VPN virtual network the outputting packet belongs; for matching the input and output interfaces and one or more of the networks VPN; and for recognizing the attachment of the input and output interfaces to the input and output nodes.

The core nodes NC1, NC2 and NC3, also referred to as transit nodes, optically store bursts in order to transfer them as a function of routing information. Each core node recognizes that a received burst belongs to a respective VPN virtual network, recognizes the transfer path to follow in the network RC by the received burst, and provides for transferring the received burst through an input port of the core node to an output port of the core node directed to the next node following the transfer path. Transferring bursts in a core node thus occurs in a transparent manner.

Each node NES, NC of the network RC contains or possesses means for accessing to a routing table associating pairs of identifier ID_CH of main transfer path CH and identifier ID_VPN of virtual network VPN respectively with input port identifiers ID_PE and output port identifiers ID_PS of the nodes crossed by the transfer path. The identifier ID_CH of a transfer path CH of a network VPN followed by a burst B transiting through nodes crossed by the transfer path is associated with the output port identifiers ID_PS of the crossed nodes in order to direct in each crossed node the burst to the output port PS connected to the node following the path designated by the identifier ID_CH associated with the identifier ID_VPN. The routing table also comprises emergency output port identifiers associated with emergency path identifiers and main path identifiers, as well as other parameters relating to characteristics of links in the network RC to the node NES, NC.

The routing table of an input and output node NES further comprises identifiers ID_IN for the input and output interfaces IN of one or plural networks VPN to which the node NES is connected. An identifier ID_IN allows to properly transfer packets to a destination equipment connected to the input and output interface designated by the identifier ID_IN as a function of the destination address in the packet.

The communication network RC comprises according to the embodiment as illustrated on FIG. 2 a managing platform PFG connected to the nodes either via dedicated signaling links or through links between nodes of the network RC. The managing platform manages a database of the VPN virtual networks in which are centralized routing tables for the nodes and intended for controlling the latter. The managing platform PFG additionally determines the possible paths for each pair of input and output nodes belonging to each network VPN, reserves resources for each network VPN, configures resources of the network RC as a function of the needs of networks VPN and initiates securing procedures.

The database includes identifiers ID_VPN of networks VPN, identifiers ID_CH of main paths CH in association with identifiers ID_VPN; identifiers of emergency paths, identifiers ID_NES of the input and output nodes NES in association with identifiers ID_VPN and identifiers ID_CH; identifiers ID_IN of the output and input interfaces attached to each input and output node, as well as other resource parameters of the network RC, such as indicators of service quality and passbands of the links between the nodes of the network RC.

The information stored in the database of the managing platform is regularly updated and used for routing bursts. The routing tables in the nodes NES and NC are locally regularly synchronized with those of the managing platform PFG under the control of the latter. The content of the database reflects all the routing tables in the nodes.

Figure 3:
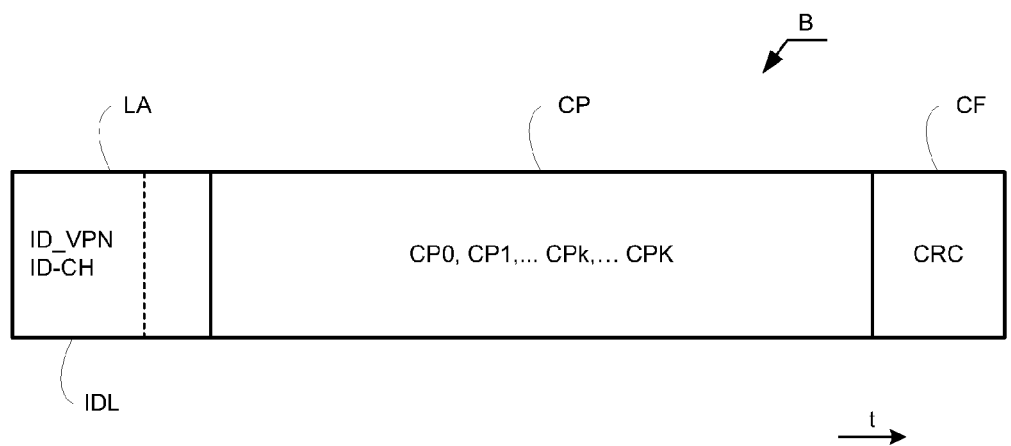
FIG. 3 shows the format of a burst with various fields according to the invention.

As shown on FIG. 3, a burst B comprises three successive fields depending on the time t: a label LA as a header, a packet field CP and an end field CF.

The label LA allows to correctly convey the burst in the OBS type network RC, from an input and output node NES to another input and output node. For this end, the label contains for routing the burst B an identification field IDL identifying that the burst B belongs to a VPN private virtual network and a path CH followed by the burst B between two input and output nodes NES of the network RC connected with interfaces of the virtual network. The identification field IDL includes the identifier ID_VPN of the network VPN to which the burst belongs or first information on that identifier of the network VPN helping to identify the network VPN, and an identifier ID_CH of the main path CH followed by the burst between the corresponding input and output nodes of the network VPN in the network RC or of second information on that identifier of the main path CH helping to identify the path.

The length of the label LA expressed in bytes is for example lower than 10 bytes.

Optionally, the identification field IDL includes the identifier of a second emergency path able to be followed by the burst B, as for example the emergency path identifier NES4-NC1-NC3-NC2-NES3 for a burst B1 (LA1, Pa, Pb) on FIG. 2, when the main path NES4-NC1-NC2-NES3 becomes unavailable or failing.

The label can still comprise other information such as an identifier for the provider of the network VPN, an indicator for the service quality QoS, etc.

When a burst gets into a node NES, NC of the network RC, the association between the virtual network identifier ID_VPN and the transfer path identifier ID_CH in the identification field IDL of the label LA of the burst B is looked for in the routing table of the node NES, NC controlled by the managing platform PFG so as to derive from it an output port to the next node of the transfer path followed by the burst B.

The packet field CP is intended for transporting the "payload" comprising one or more assembled packets P1 to PK a priori of different lengths, and information on the organization of the packet field and on routing of each packet included in the packet field.

Figure 4:
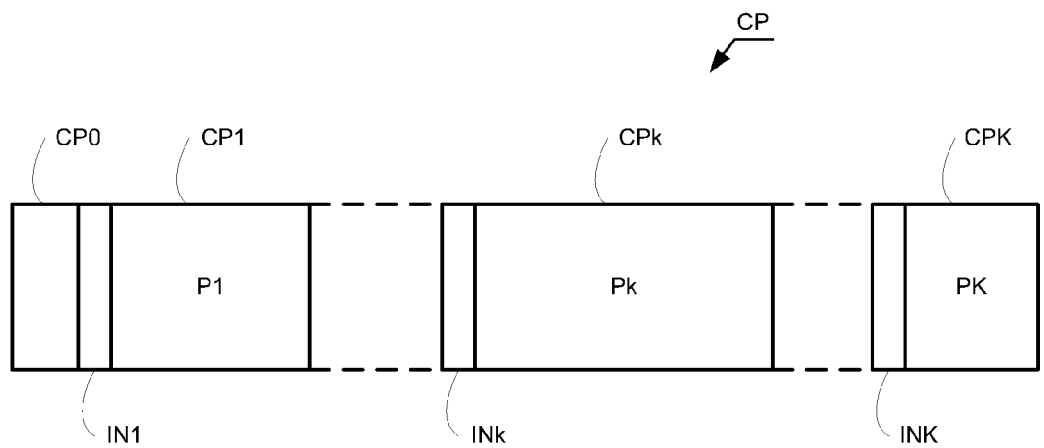
FIG. 4 shows sub-fields in a packet field included in the burst of FIG. 3.

As shown on FIG. 4, the packet field CP comprises a first packet sub-field CP0 and K packet sub-fields CP1 to CPK.

The first sub-field CP0 contains information on the payload, for example, an indicator of the start in the packet field CP, the number K of packets transported by the burst B, with $1 \leq K$, and the total length of the packet field CP for example expressed in bytes. The length of the sub-field CP0 expressed in bytes is for example 4 bytes.

The K packet sub-fields CP1 to CPK are dedicated to transporting packets. A packet sub-field CPk, with $1 \leq k \leq K$, includes a packet Pk and before the latter an identifier INk which identifies the input and output interface IN, through which the packet Pk outputs from the communication network RC in order to input to the associated VPN virtual network and which is derived from a destination address in the packet Pk. The packet sub-field CPk can include for example the identifier of the input and output interface IN, through which the packet Pk inputs to the communication network RC and outputs of the associated VPN virtual network. The identifier INk preceding the packet Pk is, for example, a prefix portion of the IP address of the destination equipment of the packet Pk or the input and output node NES through which the packet Pk outputs from the communication network RC. The identifiers IN1 to INK are intended for transferring packets P1 to PK to the respective input and output interfaces connected to the customer equipments EQ for which the packets P1 to PK are provided, after disassembling the burst B in the input and output node NES where the packets P1 to PK get out. The length of the identifiers of the input and output interfaces IN1 to INK is for example 1 or 2 bytes.

The end field CF limits the end of the burst B. It can contain a CRC ("Cyclic Redundancy Check") resulting from a function applied to at least the preceding packet field CP.

Referring again to FIG. 2, the virtual private network VPN1 transfers packets Pa and Pb from one customer equipment EQ1 up to two other customer equipments EQ6 and EQ7 attached to a same input and output node NES3 connected to the virtual private network VPN1 and retransmitting the packets in the communication network RC.

In the network VPN1, the identifier of a transfer path from the node NES4 to the node NES3 for example through the core nodes NC1 and NC2 is already memorized in the routing tables of the above mentioned nodes for transferring the packets Pa and Pb of the equipment EQ1 respectively towards the equipments EQ6 and EQ7 via the network RC. At the input of the network at node NES4, the packets Pa and Pb transmitted by the customer equipment EQ1 via the interface IN14 are oriented as a function of the identifier of the input and output interface IN14 crossed by the packets Pa and Pb and the destination address read in the packets Pa and Pb. The identifier of the interface IN14 makes it possible to derive first information helping to identify the virtual network VPN1 as the identifier ID_VPN of the network VPN1. The destination addresses read in the packets allow to derive from second information helping to identify a path NES4-NC1-NC2-NES3 between nodes NES4 and NES3 as an identifier of the path ID-CH linked to identifiers of the input and output identifiers NES4 and NES3 or the input and output interfaces IN63 and IN73 through which packets Pa and Pb will get out.

If the identifiers of the input and output nodes through which packets Pa and Pb are to output are identical, for example, to the identifier of the node NES3 according to FIG. 2, and thus if the identifiers of the paths to be followed by the packets Pa and Pb are identical, the packets Pa and Pb are assembled into a packet field CP of a common burst B1 built by the node NES4 according to FIGS. 3 and 4. The identifier of the respective "output" interface IN63, IN73 of each packet Pa, Pb is introduced before the packet in the packet field CP by the node NES4. The node NES4 adds a label LA1 as a header of the burst B1. In the label LA1, the node NES4 writes the identifier ID_VPN of the network VPN1 and routing information such as an identifier ID_CH of the transfer path CH=NES4-NC1-NC2-NES3. The node NES4 inserts the burst B1(LA1, Pa, Pb) after a conversion into optical signal in the traffic of the network RC from the node NES4 to the core node NC1.

On receiving the burst B1(LA1, Pa, Pb) in the core node NC1, the burst is optically stored for example in an optical fiber or an optical RAM memory. The burst is stored so that, in the core node NC1, the label LA1 be read electronically, and the routing table be looked up until an association is found between the identifier of the virtual network VPN1 and the identifier of the transfer path NES4-NC1-NC2-NES3 read in the label LA1. The routing table of node NC1 matches such an association of identifiers to the identifier ID_PS of an output port of the node NC1 directed to the next node NC2 following the transfer path CH=NES4-NC1-NC2-NES3 so as to transfer the burst B1 towards said output port and insert it into the traffic towards the next node NC2.

The next node NC2, being a core node, performs storing the burst B1, electronically reading the label LA1, looking up the routing table and searching some match between the associated identifiers of virtual network and transfer path read in the label LA1 and the identifier of an output port of the node NC2 directed to the next node NES3, similarly to those in node NC1, so as to insert the burst B1 in the traffic of the network RC from the node NC2 to the next node NES3.

The node NES3 disassembles the burst B1 in the packets Pa and Pb and electronically reads in the burst B1 in particular the identification field IDL of the label LA1, the number of transported packets and the total length of the packet field CP included in the sub-field CPO of the burst B1, and the identifiers of the input and output interfaces IN63, IN73. Such latter interface identifiers are found in the routing table of the node NES3 in association with the identifier ID_VPN of the network VPN1 read in the label LA1. The packets Pa and Pb are transferred respectively to the equipments EQ6 and EQ7 via the interfaces IN63 and IN73, the identifiers of which have been found.

Thereby, the packet assembling and disassembling operations, also referred to as aggregation and disaggregation, in the input and output nodes NES4 and NES3 and the label reading operations in the nodes occur in the electronic field. In the core nodes, the burst B1 remains in the optical field.

Still referring to FIG. 2, the virtual private network VPN1 transfers packets Pa and Pb from one customer equipment EQ1 to two other customer equipments EQ6 and EQ7 attached to one common node NES3 belonging to the network VPN1 as previously, and also transfers the packets Pc and Pd from customer equipment EQ1 to another customer equipment EQ5 attached to the input and output node NES2 connected to the network VPN1 and intended to retransmit the packets Pc and Pd.

In the virtual private network VPN1, the identifier of the transfer path CH=NES4-NC1-NC2-NES3 as well as the identifier of a transfer path CH=NES4-NC1-NC3-NES2 from the node NES4 towards the node NES2, for example through the core nodes NC1 and NC3, are already memorized in the above mentioned routing table so as to transfer the packets Pa and Pb from the equipment EQ1 respectively to the equipments EQ6 and EQ7 and the packets Pc and Pd from the equipment EQ1 to the equipment EQ5 via the network RC. Upon receiving such packets, the routing table of the node NES4 is looked up to associate to the four packets Pa, Pb, Pc and Pd the identifier of the input and output interface IN14 crossed by such packets and thus the identifier of the virtual network VPN1, and as a function of the destination addresses read in the packets to associate with the packets Pa and Pb the identifiers of the respective input and output interfaces IN63 and IN73 and with the packets Pc and Pd of the respective input and output interfaces IN52.

As the respective input and output interfaces IN63 and IN73 are connected to a common input and output node NES3, the packets Pa and Pb follow the same transfer path CH=NES4-NC1-NC2-NES3 and are assembled in a common burst B1 built by the node NES4 and having a label LA1 including the identifier ID_VPN of the network VPN1 and the identifier ID_CH of the above mentioned transfer path. Similarly, as the customer equipment EQ5 is both the recipient of the packets Pc and Pd and is connected to the input and output node NES2 via the input and output interface IN52, the packets Pc and Pd follow the same transfer path CH=NES4-NC1-NC3-NES2 and are assembled in a common burst B2 built by the node NES4 and having a label LA2 including the identifier ID_VPN of the network VPN1 and the identifier ID_CH of the above mentioned transfer path. The routing table of the node NES4 makes the association of identifiers of the network VPN1 and the path NES4-NC1-NC2-NES3 match with the identifier of an output port of the node NES4 directed towards the next node NC1 so as to transfer the burst B1 to said output port and insert it in the traffic towards the next node NC1. Similarly, the routing table of the node NES4 makes the association of identifiers of the network VPN1 and the path NES4-NC1-NC3-NES2 match with the identifier of the previous output port or another output port of the node NES4 directed towards the next node NC1 so as to transfer the burst B2 to said output port and insert it in the traffic towards the next node NC1.

Both bursts B1(LA1, Pa, Pb) and B2(LA2, Pc, Pd) are optically stored in the core node NC1 electronically reading the labels LA1 and LA2. If, in the routing table of the node NC1, there is found the association of the identifier of the virtual network VPN1 and the identifier of the transfer path NES4-NC1-NC2-NES3 read in the label LA1, the burst B1 is directed towards an output port of the node NC1 which is connected to the next node NC2 following the transfer path NES4-NC1-NC2-NES3. If, in the routing table of the node NC1, there is found the association of the identifier of the virtual network VPN1 and the identifier of the transfer path NES4-NC1-NC3-NES2 read in the label LA2, the burst B2 is directed towards an output port of the node NC1 which is connected to the next node NC3 following the transfer path NES4-NC1-NC2-NES2.

Then the next nodes NC2 and NC3 respectively insert the burst B1 in the traffic of the network RC towards the next node NES3 following the transfer path NES4-NC1-NC2-NES3 and the burst B2 in the traffic of the network RC towards the next node NES2 following the transfer path NES4-NC1-NC3-NES2, similarly to storing the burst, electronically reading the label, looking up the routing table and searching a match between identifiers of virtual networks and the transfer path read and an identifier of the output port as previously described for the burst B1.

The node NES3 disassembles the burst B1 into packets Pa and Pb in order to respectively transfer them to the equipments EQ6 and EQ7 via the interfaces IN63 and IN73, the identifiers of which are extracted from the field CP of the burst B1, as previously. The node NES2 disassembles the burst B2 into packets Pc and Pd and electronically reads in the burst B2 the identification field IDL of the label LA2, the sub-field CPO and the identifiers of the input and output interface IN52. Such latter interface identifiers are found in the routing table of the node NES2 in association with the identifier of the network VPN1 extracted from the label LA2. The packets Pc and Pd are transferred towards the equipment EQ5 via the interface IN52.

Referring now to FIG. 5, the input and output node NES4 receives packets Pe and Pf and packets Pg and Ph respectively from customer equipments EQ1 and EQ2 belonging to two different virtual private networks VPN1 and VPN2, and one single input and output node NES2 distributes packets Pe and Pf towards a recipient customer equipment EQ5 belonging to the network VPN1 and the packets Pg and Ph towards a recipient customer equipment EQ4 belonging to the network VPN2.

It is assumed that all four packets Pe, Pf, Pg and Ph follow one common transfer path CH=NES4-NC1-NC3-NES2 in the network RC between the input and output nodes NES4 and NES2, while, in an alternative, packets Pe and Pf in a burst and packets Pg and Ph in another burst can follow different transfer paths between the nodes NES4 and NES2. In the virtual private networks VPN1 and VPN2, the identifier of a transfer path of the node NES4 towards the node NES2 for example through the core nodes NC1 and NC3 is already memorized in the routing tables of the above mentioned nodes so as to transfer the packets Pe, Pf, Pg and Ph from the equipments EQ1 and EQ2 respectively to the equipments EQ5 and EQ4 via the network RC.

At the input of the network at node NES4, the packets Pe and Pf transmitted by the customer equipment EQ1 via the input and output interface IN14 are oriented as a function of the identifier of the interface IN14 crossed by the packets Pe and Pf, identifying the network VPN1, and as a function of destination addresses read in the packets Pe and Pf, identifying an "output" node NES2 and an "output" interface IN52 through which the packets Pe and Pf are to get out. Similarly, the packets Pg and Ph transmitted by the customer equipment EQ2 via the input and output interface IN24 are oriented as a function of the identifier of the interface IN24 crossed by the packets Pg and Ph, identifying the network VPN2, and as a function of destination addresses read in the packets Pg and Ph, identifying an "output" node NES2 and an "output" interface IN42 through which the packets Pg and Ph are to get out.

The packets Pe and Pf being directed to one common recipient customer equipment EQ5 in the network VPN1, the packets Pe and Pf follow the same transfer path CH=NES4-NC1-NC3-NES2 and are assembled in one common burst B3 built by the node NES4. Similarly, the packets Pe and Pf being directed to one common recipient customer equipment EQ4 in the network VPN2, the packets Pe and Pf follow the same transfer path CH=NES4-NC1-NC3-NES2 and are assembled in one common burst B4 built by the node NES4. The bursts B3 and B4 have labels LA3 and LA4 respectively including the identifiers of the virtual private networks VPN1 and VPN2 and having in common the identifier of the above mentioned transfer path NES4-NC1-NC3-NES2. The routing table of the node NES4 makes the association of identifiers of the network VPN1 and the path NES4-NC1-NC3-NES2 match with the identifier of an output port directed towards the next node NC1 so as to transfer the burst B3 to said output port and insert it in the traffic towards the node NC1, and makes the association of identifiers of the network VPN2 and the path NES4-NC1-NC3-NES2 match with the identifier of the previous output port or another output port directed towards the next node NC1 so as to transfer the burst B4 to this output port and to insert it in the traffic towards the node NC1. The node NES4 determines the transfer order and instants of the bursts B3 and B4 so as to avoid collisions in the traffic towards the core node NC1.

Then, the next nodes NC1 and NC3 insert the bursts B3(LA3, Pe, Pf) and B4(LA4, Pg, Ph) into the traffic of the network RC towards the following respective nodes NC3 and NES2 following the transfer path NES4-NC1-NC3-NES2 similarly to storing a burst, electronically reading a label, looking up the routing table and searching a match between the read identifiers of the virtual network and the transfer path and an identifier of the output port, as previously described for the burst B1 in the core nodes NC1 and NC2.

The node NES2 disassembles the burst B3 into the packets Pe and Pf and electronically reads in the burst B3 the identification field IDL of the label LA3, the sub-field CPO and the identifier of the input and output interface IN52 before the packets Pe and Pf in order to find this interface identifier in the routing table of the node NES2 in association with the identifier of the network VPN1 extracted from the label LA3 and transfer the packets Pe and Pf towards the equipment EQ5 via the interface IN52. The node NES2 disassembles the burst B4 into the packets Pe and Pf and electronically reads in the burst B4 the identification field IDL of the label LA4, the sub-field CPO and the identifier of the input and output interface IN42 before the packets Pe and Pf in order to find this interface identifier in the routing table of the node NES2 in association with the identifier of the network VPN2 extracted from the label LA4 and transfer the packets Pe and Pf towards the equipment EQ4 via the interface IN42.

According to burst alternatives according to the invention, instead of the identifier ID_CH of a path CH in the identification field IDL of the label LA of a burst B or as a complement of the identifier ID_CH, an input and output node NES receiving the packets P of a virtual network introduces information helping to identify the path to be followed by the burst assembling the received packets, as the identifier ID_IN of an input and output interface, which is to enter a packet P to be introduced in the burst B, the identifier ID_IN of an input and output interface which is to pull out a packet P extracted from the burst B, the address of an input and output node serving the input and output interface IN, which is to enter a packet P to be introduced into the burst B, or the address of an input and output node serving the input and output interface IN, which is to pull out a packet P extracted from the burst B. The routing tables in the nodes NES and NC and in the managing platform PFG are then modified consequently.

According to another embodiment, the control of the routing tables in the nodes NES and NC of the network RC is no longer centralized in a managing platform PFG, but instead is distributed in the nodes NES and NC according to a control scheme of the nodes.

The invention described here relates to a burst assembling packets, a method of assembling packets to be transmitted in a virtual network supported by a communication network, a node, such as the node NES4, through which packets Pa and Pb to be transmitted in a virtual network VPN1 are able to input to a communication network RC supporting the virtual network, a core node, such as the node NC1, NC2, through which packets Pa and Pb to be transmitted in a virtual network VPN1 are able to transit in a communication network RC supporting the virtual network VPN1, and a node, such as the node NES3, through which packets Pa and Pb to be transmitted in a virtual network VPN1 are able to output from a communication network RC supporting the virtual network. In an embodiment, the steps in the method of the invention are determined by instructions of computer programs incorporated respectively into said nodes. The programs include program instructions which, when said programs are executed respectively in said nodes, whose operation is then controlled by executing the programs, perform the steps in the method of the invention.

Consequently the invention also applies to computer programs adapted to implement the invention, including computer programs stored on or in one or plural storage mediums readable by a computer and any data processing device. Such programs may be written in any programming language and take the form of source code, object code, or intermediate code between source code and object code, e.g. in a partially compiled form, or any other form suitable for implementing the method of the invention.

A storage medium may be any entity or device capable of storing the program. For example, the medium may comprise storage means on which the computer program of the invention are stored, such as a ROM, for example a CD-ROM or a microelectronic circuit ROM, or USB key, or magnetic storage means, for example a diskette (floppy disk) or hard disk.

Furthermore, the storage medium may be a transmissible medium such as an electrical or optical signal, which may be routed via an electrical or optical cable, by radio or by other means. The programs of the invention may in particular be downloaded over an internet type network.

Alternatively, the storage medium may be an integrated circuit into which the programs are incorporated, the circuit being adapted to execute the method of the invention or to be used in the execution of the method of the invention.

The invention claimed is:

1. A core node through which optical packets to be transmitted in a virtual network are able to transit in a communication network supporting said virtual network, said core node being configured to optically store a burst comprising a packet field assembling optical packets coming from said virtual network and a label preceding said packet field and including first information helping to identify said virtual network and second information helping to identify a path between a first node through which said packets are to be input to said communication network and a second node through which said packets are to be output from said communication network, said first information and second information being unchanged during the crossing of said communication network between said first node and second node by said burst, to search for an output port directed to a next node following said path corresponding to said first information and second information read in said label, and to transfer said burst to said output port to insert said burst into the traffic towards said next node.

2. A node through which packets to be transmitted in a virtual network are to be input to a communication network supporting said virtual network, said node being adapted to assemble packets coming from said virtual network in a packet field and to construct a burst comprising said packet field and a label preceding said packet field and including first information helping to identify said virtual network and second information helping to identify a path between said node and a second node through which said optical packets are to be output from said communication network, said first information and second information being unchanged during the crossing of said communication network by said burst between said first node and second node.

3. A node through which optical packets to be transmitted in a virtual network are to be output from a communication network supporting said virtual network, said node being configured to disassemble, into optical packets coming from said virtual network, a burst comprising a packet field assembling said optical packets before each of which an identifier identifying an interface through which said each packet is to be output from said communication network is introduced, and a label preceding said packet field and including first information helping to identify said virtual network and second information helping to identify a path between a first node through which said optical packets are to be input to said communication network and said node, and to search for identifiers of said interfaces read in said burst in association with said first information, to transfer said packets via said interfaces.

4. A non-transitory computer readable information medium comprising a computer program for execution in a node through which optical packets to be transmitted in a virtual network are to be input to a communication network supporting said virtual network, said program comprising instructions which, when said program is executed in said node, perform assembling packets coming from said virtual network in a packet field and constructing a burst comprising said packet field and a label preceding said packet field and including first information helping to identify said virtual network and second information helping to identify a path between said node and a second node through which said optical packets are to be output from said communication network, said first information and second information being unchanged during the crossing of said communication network between said first node and second node by said burst.

5. A non-transitory computer-readable information medium comprising a computer program for execution in a core node through which optical packets to be transmitted in a virtual network are to transit in a communication network supporting said virtual network, said program comprising instructions which, when said program is executed in said core node, perform optically storing a burst comprising a packet field assembling packets coming from said virtual network and a label preceding said packet field and including first information helping to identify said virtual network and second information helping to identify a path between a first node through which said packets are to be input to said communication network and a second node through which said packets are to be output from said communication network, said first information and second information being unchanged during the crossing of said communication network between said first node and second node by said burst, searching for an output port directed to said next node following said path corresponding to said first information and second information read in said label, and transferring said burst to said output port to insert said burst into the traffic towards said next node.

6. A non-transitory computer readable information medium comprising a computer program for execution in a node through which optical packets to be transmitted in a virtual network are to be output from a communication network supporting said virtual network, said program comprising instructions which, when said program is executed in said node, perform disassembling into optical packets coming from said virtual network a burst comprising a packet field assembling said optical packets before each of which an identifier identifying an interface through which said each packet is to be output from said communication network is introduced, and a label preceding said packet field and including first information helping to identify said virtual network and second information helping to identify a path between a first node through which said packets are to be input to said communication network and said node, and searching for identifiers of said interfaces read in said burst in association with said first information, to transfer said packets via said interfaces.

7. A method of disassembling packets to be transmitted in a virtual network supported by a communication network, said method comprising, in a second node through which packets, coming from said virtual network following a path from a first node through which packets are input to said communication network, are output from said communication network, disassembling a burst transmitted by said communication network into packets coming from said virtual network and a label preceding said packets and including a first information helping to identify said virtual network and a second information helping to identify said path, said first information and second information being unchanged during the crossing of said communication network between said first node and second node by said burst.

8. The method as claimed in claim 7, comprising, in said first node, for each optical packet to be assembled in said burst, introducing before said optical packet an identifier identifying an interface through which said optical packet is to be output from said communication network and derived from a destination address in said packet, and in said second node, searching for identifiers of said interfaces read in said burst in association with said virtual network to transfer said packets via said interfaces.

9. A method of assembling optical packets to be transmitted in a virtual network supported by a communication network, said communication network comprising a first node through which optical packets are input to said communication network, said method comprising assembling optical packets coming from said virtual network in a packet field and constructing a burst comprising said packet field and a label preceding said packet field and including first information helping to identify said virtual network and second information helping to identify a path between said first node and a second node through which said packets are to be output from said communication network, said first information and second information being unchanged during crossing of said communication network between said first node and second node by said burst.

10. The burst as claimed in claim 9, wherein said packet field comprises a first sub-field including said number of packets included in said packet field and the length of said packet field.

11. The burst as claimed in claim 10, wherein each optical packet in said packet field is preceded by an identifier identifying an interface through which said packet to be output rom said communication network, and derived from a destination address in said packet.

12. The burst as claimed in claim 9, wherein said label includes an identifier of a second path between said first node and second node.

13. The method as claimed in claim 9, wherein said first information helping to identify said virtual network for each optical packet received by said first node are derived from a crossing of said packet through a respective interface connected to said first node.

14. The method as claimed in claim 9, wherein said second information helping to identify a path between said first node and second node for each packet received by said first node are derived from a destination address read in said packet.

15. The method as claimed in claim 9, comprising in a core node of said communication network located on said path between said first node and second node, optically storing said burst, searching for an output port directed to a next node following a path corresponding to said first information and second information read in said label, and transferring said burst to said output port to insert said burst into the traffic towards said next node.

* * * * *